(12) United States Patent
McCarthy et al.

(10) Patent No.: US 8,438,844 B2
(45) Date of Patent: May 14, 2013

(54) FLOATABLE WAVE ENERGY CONVERTER AND A METHOD FOR IMPROVING THE EFFICIENCY OF A FLOATABLE WAVE ENERGY CONVERTER

(75) Inventors: Michael John Martin McCarthy, Cobh (IE); Michael Martin Whelan, Ballymore (IE)

(73) Assignee: Maritime Technologies Limited, Cobh, County Cork (IE)

( * ) Notice: Subject to any disclaimer, the term of this patent is extended or adjusted under 35 U.S.C. 154(b) by 938 days.

(21) Appl. No.: 12/446,095

(22) PCT Filed: Oct. 18, 2007

(86) PCT No.: PCT/IE2007/000103
§ 371 (c)(1),
(2), (4) Date: Jun. 23, 2009

(87) PCT Pub. No.: WO2008/047337
PCT Pub. Date: Apr. 24, 2008

(65) Prior Publication Data
US 2010/0038912 A1 Feb. 18, 2010

(30) Foreign Application Priority Data
Oct. 20, 2006 (IE) .................................. S2006/0770

(51) Int. Cl.
*F03B 13/24* (2006.01)
*F03B 13/14* (2006.01)
(52) U.S. Cl.
USPC .............................................. 60/398; 290/42
(58) Field of Classification Search .................... 60/398, 60/497, 501, 507; 290/42
See application file for complete search history.

(56) References Cited

U.S. PATENT DOCUMENTS

| 4,248,044 | A | * | 2/1981 | Woodilla ........................ 60/497 |
| 4,741,157 | A | | 5/1988 | Nishikawa |
| 4,858,434 | A | * | 8/1989 | Masuda ......................... 60/398 |
| 6,935,808 | B1 | | 8/2005 | Dempster |
| 2004/0201223 | A1 | | 10/2004 | Grinsted et al. |

FOREIGN PATENT DOCUMENTS

| EP | 0950812 A2 | 10/1999 |
| GB | 2020756 A | 11/1979 |
| SU | 1164381 A | 6/1985 |
| WO | 8401603 | 4/1984 |

OTHER PUBLICATIONS

Yoshio Masuda—Institute of Electrical and Electronics Engineers: "Improvement of Economy of Wave Power Generation by Backward Bent Duct Buoy" Ocean Technologies and Opportunities in the Pacific for the 90'S, Honolulu, Oct. 1-3, 1991, IEEE, US, vol. 3, Oct. 1, 1991, pp. 216-223, XP01050053450.

* cited by examiner

*Primary Examiner* — Thomas E Lazo
(74) *Attorney, Agent, or Firm* — Sughrue Mion, PLLC (57) ABSTRACT

A wave energy converter includes a housing having a forward end and an aft end. Three upstanding air chambers are located in the housing and three corresponding water accommodating ducts extend aft from the air chambers and terminate in aft water accommodating openings for accommodating water into and out of the air chambers as the housing oscillates by pitching in response to passing waves. An air accommodating duct communicates with the air chambers through a manifold for accommodating air into and out of the air chambers as the water level falls and rises within the air chambers as the housing oscillates. A self-rectifying turbine in the air accommodating duct powers an electrical generator. A first stabilizing plate extends forwardly and downwardly from the forward end of the housing for controlling the oscillating motion of the housing.

25 Claims, 6 Drawing Sheets

FLOATABLE WAVE ENERGY CONVERTER AND A METHOD FOR IMPROVING THE EFFICIENCY OF A FLOATABLE WAVE ENERGY CONVERTER

The present invention relates to a floatable wave energy converter, and to a method for improving the efficiency of a floatable wave energy converter.

Wave energy converters for converting wave energy, for example, wave energy in the sea, in a lake or other such expanse of water to mechanical rotational energy are known. In general, the mechanical rotational energy is used to drive an electrical generator for generating electrical power. Such wave energy converters are disclosed in European Patent Specification No. 0,950,812 of Masuda et al, U.S. Pat. No. 4,741,157 of Nishikawa and U.S. Pat. No. 4,858,434 of Masuda, assigned to Nishikawa. All such wave energy converters disclosed in these three prior art specifications comprise a housing which extends between a forward and an aft end, and is moored so that the forward end faces into oncoming waves. The mooring of the housing is arranged so that the housing oscillates by pitching in a forward/aft direction in response to passing waves. An upwardly extending air chamber is formed in the housing adjacent the forward end thereof, and a water accommodating duct extends aft from the air chamber and terminates in an aft water accommodating opening for accommodating water into and out of the air chamber as the housing oscillates. An air accommodating duct extending from the air chamber accommodates air into and out of the air chamber as the water level within the air chamber varies as a result of the oscillating movement of the housing. A turbine located in the air accommodating duct is driven by air passing through the air accommodating duct in response to the rising and falling water level in the air chamber for driving an electrical generator, which in turn produces electricity from the oscillating motion of the housing. A buoyancy material is located aft of the air chamber over the water accommodating duct in the wave energy converters of the three prior art Patent specifications. However, in the two U.S. prior art patent specifications buoyancy material is also located extending forwardly of the forward end of the housing of the wave energy converters.

Accordingly, with any one of the wave energy converters moored by a suitable mooring system with the forward end of the housing facing into the oncoming waves, the passing waves cause the housing to oscillate with a pitching movement in a forward/aft direction which in turn causes water to flow into and out of the air chamber on each oscillating cycle of the housing through the water accommodating duct. As the water flows into and out of the air chamber the water level in the air chamber rises and falls. This results in air being sequentially urged outwardly and inwardly through the air accommodating duct. Depending on the type of turbine used, the turbine is rotated in the same direction irrespective of the direction of flow of air through the air accommodating duct, or alternatively, may only rotate in one direction in response to air either being urged outwardly or inwardly through the air accommodating duct. In such cases, in general, a system of valves and corresponding ducts is provided in order to convert the flow through the air accommodating duct in the two directions to flow through the turbine in a single unitary direction.

In certain cases, the wave energy converters described in the three prior art specifications may be provided with one or more air chambers, and one or more water accommodating ducts, and typically, where more than one air chamber is provided, a corresponding number of water accommodating ducts are provided for accommodating water into the respective corresponding air chambers.

While such wave energy converters do act to convert wave energy to mechanical rotational energy, which may be used to drive an electrical generator for in turn generating electricity, in general, such wave energy converters suffer from two serious disadvantages, firstly, they tend to be relatively inefficient at converting wave energy to electrical power, and in particular, in converting wave energy to mechanical rotational energy, and secondly, they tend to be relatively unstable, in particular, in relatively rough waters where the wave height is relatively high. While some attempt has been made in the wave energy converter disclosed in European Patent Specification No. 0,950,812 to increase the efficiency of conversion of wave energy to mechanical rotational energy, the wave energy converters disclosed in the three prior art specifications still tend to be relatively inefficient.

There is therefore a need for a wave energy converter which addresses at least some of the problems of prior art wave energy converters, and there is also a need for providing a method for improving the efficiency of such wave energy converters for converting wave energy to mechanical rotational energy.

The present invention is directed towards providing such a wave energy converter, and the invention is also directed towards a method for improving the efficiency of a floatable wave energy converter.

According to the invention there is provided a floatable wave energy converter for converting wave energy to electricity, the wave energy converter comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, and a first stabilising plate extending below a waterline of the housing in a generally forward downward direction from the forward end of the housing for controlling the heaving and pitching motion of the housing to maximise the efficiency of conversion of the movement of the housing in water to useable energy.

Preferably, the first stabilising plate extends from the housing at a level below the waterline. Advantageously, the first stabilising plate extends generally transversely of the forward/aft direction of the housing.

In one embodiment of the invention the first stabilising plate extends from the forward end of the housing at an angle to the vertical in the range of 30° to 60° when the housing is floating with the water accommodating duct lying substantially horizontally. Preferably, the first stabilising plate extends from the forward end of the housing at an angle to the vertical in the range of 40° to 50° when the housing is floating with the water accommodating duct lying substantially horizontally. Advantageously, the first stabilising plate extends from the forward end of the housing at an angle to the vertical of approximately 45° when the housing is floating with the water accommodating duct lying substantially horizontally.

Ideally, the first stabilising plate extends substantially the full transverse width of the housing adjacent the forward end thereof.

In another embodiment of the invention a forwardly facing portion of the housing adjacent the forward end thereof slopes in a generally downward aft direction. Preferably, the forwardly facing sloping portion of the housing is formed by a lower portion of the housing. Advantageously, the forwardly facing sloping portion of the housing is located below the waterline.

In one embodiment of the invention the forwardly facing sloping portion of the housing is inclined to the vertical at an angle in the range of 30° to 60° when the housing is floating with the water accommodating duct lying substantially horizontally. Preferably, the forwardly facing sloping portion of the housing is inclined to the vertical at an angle in the range of 40° to 50° when the housing is floating with the water accommodating duct lying substantially horizontally. Advantageously, the forwardly facing sloping portion of the housing is inclined to the vertical at an angle of approximately 45° when the housing is floating with the water accommodating duct lying substantially horizontally.

In another embodiment of the invention the first stabilising plate extends from the forwardly facing sloping portion of the housing. Preferably, the first stabilising plate extends from the forwardly facing sloping portion of the housing at an angle thereto. Advantageously, the first stabilising plate extends from the forwardly facing sloping portion of the housing at an angle of approximately 90° thereto.

In another embodiment of the invention the first stabilising plate is reinforced by at least one gusset plate extending between the first stabilising plate and the housing. Preferably, the first stabilising plate is reinforced by a plurality of spaced apart gusset plates extending between the first stabilising plate and the housing.

In a further embodiment of the invention a forward ballast means is provided adjacent the forward end of the housing for stabilising the housing. Preferably, the forward ballast means is located forward of the air chamber. Advantageously, the forward ballast means is located above the level of the first stabilising plate.

In one embodiment of the invention the forward ballast means extends upwardly from a level at which the first stabilising plate extends from the forward end of the housing.

Preferably, the forward ballast means is adjustable for selectively adjusting the weight thereof.

In one embodiment of the invention the forward ballast means comprises a ballast tank for accommodating ballast therein, and advantageously, the ballast tank is adapted for accommodating water ballast.

In another embodiment of the invention at least one second stabilising plate extends from the housing and is responsive to wave motion passing the housing for maintaining the housing oriented with the forward end thereof facing into the waves. Preferably, the at least one second stabilising plate extends in a generally forward/aft direction of the housing. Advantageously, the at least one second stabilising plate extends upwardly from the housing. Ideally, the at least one second stabilising plate is located towards the aft end of the housing.

In one embodiment of the invention a pair of spaced apart second stabilising plates extend from the housing.

Preferably, the air chamber is formed in the housing adjacent the forward end thereof. Advantageously, the water accommodating duct extends aft from the air chamber. Ideally, the water accommodating opening from the water accommodating duct is located in the aft end of the housing.

Preferably, the air chamber extends upwardly from the water accommodating duct adjacent the forward end thereof.

In another embodiment of the invention a buoyancy means is provided for maintaining the housing floating on the water. Preferably, the buoyancy means is located aft of the air chamber. Advantageously, the buoyancy means is located above the water accommodating duct. Ideally, the buoyancy means extends from a location aft of the air chamber and terminates at an aft end intermediate the air chamber and the aft end of the housing.

In one embodiment of the invention the buoyancy means terminates at its aft end closer to the air chamber on respective opposite side edges of the housing than at a location intermediate the side edges thereof. Preferably, the buoyancy means terminates at its aft end closest to the aft end of the housing at a location midway between the opposite side edges of the housing.

In one embodiment of the invention the aft end of the buoyancy means is substantially arcuate when viewed in plan. Advantageously, the aft end of the buoyancy means is substantially semicircular when viewed in plan.

Preferably, the buoyancy means is located adjacent the air chamber.

In one embodiment of the invention the buoyancy means comprises a buoyancy tank.

In another embodiment of the invention the buoyancy tank is adapted for filling with air. Alternatively, the buoyancy tank is adapted for filling with an expanded plastics buoyant material.

In one embodiment of the invention the converting means for converting air being urged through the air accommodating duct to rotational motion comprises a turbine. Preferably, the turbine is a self-rectifying turbine so that irrespective of the direction of air flow past the turbine, the turbine rotates in one direction only. Advantageously, the converting means is located in the duct. Ideally, the converting means is coupled to an electrical generator.

In one embodiment of the invention the converting means is coupled inline to the generator.

Preferably, the generator is located in the air accommodating duct.

In one embodiment of the invention at least two air accommodating ducts are provided. Preferably, a converting means is located in each air accommodating duct.

In another embodiment of the invention a plurality of parallel water accommodating ducts are formed in the housing. Preferably, a plurality of air chambers are formed in the housing. Advantageously, one air chamber is provided corresponding to each water accommodating duct.

In another embodiment of the invention a manifold is provided for communicating the air chambers with the one or more air accommodating duct.

In a further embodiment of the invention a coupling means is provided on the housing for coupling the housing to a mooring system with the forward end of the housing facing into the waves. Preferably, the coupling means for coupling the housing to the mooring system comprises a forward coupling means located at the forward end of the housing. Advantageously, a pair of forward coupling means are provided on respective opposite sides of the forward end of the housing for coupling the housing to the mooring system. Advantageously, the coupling means for coupling the housing to the mooring system comprises an aft coupling means located at the aft end of the housing. Ideally, a pair of spaced apart aft coupling means are provided.

The invention also provides a floatable energy converter for converting wave energy to electricity, the wave energy converter comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, and a forward ballast means provided adjacent the forward end of the housing for stabilising the housing.

Preferably, the forward ballast means is located forward of the air chamber.

In one embodiment of the invention the forward ballast means is partly defined by a portion of the forwardly facing sloping portion of the housing.

The invention also provides a floatable wave energy converter for converting wave energy to electricity, the wave energy converter comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, and a forwardly facing portion of the housing adjacent the forward end thereof sloping in a generally downward aft direction.

Preferably, the forwardly facing sloping portion of the housing is formed by a lower portion of the housing.

Additionally, the invention provides a method for improving the efficiency of a floatable wave energy converter for converting wave energy to mechanical rotational energy, wherein the wave energy converter is of the type comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, the method comprising providing a first stabilising plate extending below a waterline of the housing in a generally forward downward direction from the forward end of the housing for controlling the heaving and pitching motions of the housing to maximise the efficiency of conversion of the movement of the housing in water to useable energy.

The advantages of the invention are many. The floatable wave energy converter according to the invention is particularly efficient, and it has been found in comparative tests is considerably more efficient than prior art floatable wave energy converters of a substantially similar type, and thus, the wave energy converter according to the invention provides a significantly enhanced power output than can be achieved from prior art converters.

It is believed that the provision of the first stabilising plate contributes significantly to the enhanced efficiency of the wave energy converter according to the invention. It is believed that the first stabilising plate enhances the relative motion between the wave energy converter and the wave motion in a controlled manner, and in particular the heaving and pitching motion of the wave energy converter, and maximises the rise and fall of the water level within the air chamber, which in turn maximises the efficiency of conversion of the wave motion to mechanical rotational energy, and in turn maximises the power output from the wave energy converter. It is also believed that the enhanced efficiency and power output of the wave energy converter according to the invention is achieved by a combination of the provision of the first stabilising plate and the buoyancy means, and in particular, by the location of the first stabilising plate relative to the location of the buoyancy means, whereby the first stabilising plate is located forward of the air chamber and the buoyancy means is located aft of the air chamber. Additionally, it is believed that the provision of the ballast means forward of the air chamber also contributes to the enhanced efficiency, and in turn, the enhanced power output of the wave energy converter according to the invention. It is believed that the combined effect of the first stabilising plate, the buoyancy means and the ballast means act together to further control the relative motion between the wave energy converter and the wave motion, and in particular the heaving and pitching motion of the wave energy converter, in order to enhance the efficiency and the power output from the wave energy converter according to the invention.

Additionally, the wave energy converter according to the invention is particularly stable in water, and is particularly stable in relatively rough sea conditions where the waves are relatively high, and it has been found that the wave energy converter according to the invention is stable in waves of significant height up to at least sixteen meters in height. It is believed that the stability of the wave energy converter according to the invention is achieved by the provision of the ballast means, and the stability of the wave energy converter according to the invention is also contributed to by a combination of the first stabilising plate and the ballast means. Indeed, the second stabilising plate also play a part in stabilising the wave energy converter.

The invention will be more clearly understood from the following description of a preferred embodiment thereof, which is given by way of example only, with reference to the accompanying drawings, in which.

Referring to the drawings, there is illustrated a floatable wave energy converter according to the invention, indicated generally by the reference numeral 1, for converting wave energy to mechanical rotational energy, and in turn to electricity. The wave energy converter 1 comprises a housing 2 constructed of a structural steel framework (not shown) which is clad by panelling. The panelling may be of any suitable material, for example, sheet metal or metal plate, concrete or plastics materials such as fibreglass and the like. Indeed, the entire housing may be constructed of reinforced concrete. The construction of such a housing from a structural steel framework and panel cladding or other such materials will be well known to those skilled in the art. The housing 2 is floatable on the ocean and extends between a forward end 3 and an aft end 4, and in use is moored with the forward end 3 facing into the waves to oscillate with a pitching action fore and aft in response to wave motion as the waves pass along the housing 2 from the forward end 3 to the aft end 4.

The panel clad structural steel framework of the housing 2 comprises a pair of side walls 5 extending upwardly from a base 6 and joined at the forward end 3 by a front wall 7. An upwardly extending intermediate wall 8 joins the side walls 9 intermediate the forward end 3 and the aft end 4. An upper top wall 10 extending between the front wall 7 and the intermediate wall 8 joins the side walls 5 towards the forward end 3 of the housing 2, while a lower top wall 11 extending from the intermediate wall 8 to the aft end 4 of the housing 2 also joins the side walls 5. The side walls 5, the base 6, the front wall 7, the intermediate wall 8 and the upper and lower top walls 10 and 11 define a main hollow interior region 12 within the housing 2.

Two spaced apart partition walls 13 which are spaced apart from the side walls 5 and extend parallel thereto from the front wall 7 to the aft end 4 of the housing 2 define with the side walls 5, the front wall 7 and the intermediate wall 8 three upstanding air chambers 15 within the main hollow interior region 12 of the housing 2 adjacent the forward end 3. The partition walls 13 also define with the side walls 5, the base 6 and the lower top wall 11 three corresponding water accommodating ducts 16 in the main hollow interior region 12 for accommodating water into and out of the air chamber 15 as the housing 2 oscillates in response to wave motion. The water accommodating ducts 16 communicate with the corresponding air chambers 15 and extend aft therefrom to the aft end 4 of the housing 2, where they terminate in respective water accommodating openings 17 for accommodating water into and out of the air chambers 15. The air chambers 15 extend upwardly from the corresponding water accommodating ducts 16 at an angle of approximately 90° thereto. The partition walls 13 at the forward end 3 of the hollow interior region 12 where they define the air chambers 15 terminate in upper edges 18 which is above the normal waterline 19 at which the housing 2 would float normally in still water.

The upper top wall 10, the front wall 7, the intermediate wall 8 and the side walls 5 at a level above the upper edges 18 of the partition walls 13 define a manifold 20 which intercommunicates the air chambers 15. An air accommodating duct 21 extends aft from the intermediate wall 8 and communicates with the manifold 20 for accommodating air out of and into the air chambers 15 as the water level 19a therein rises and falls during oscillation of the housing 2 in response to passing waves.

Figure 1:
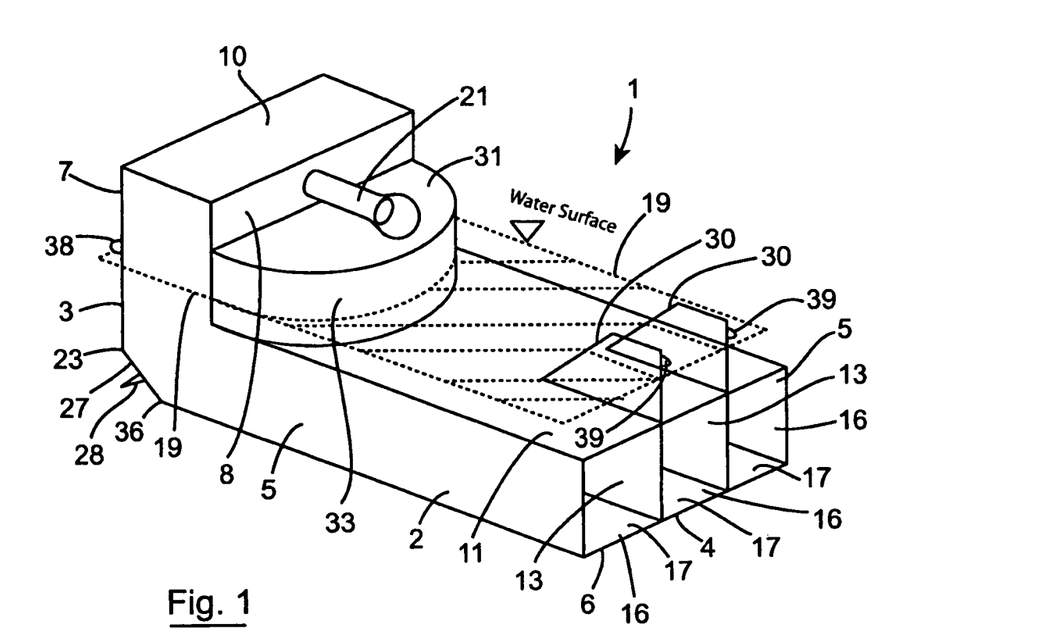
FIG. 1 is a diagrammatic perspective view of a floatable wave energy converter according to the invention for converting wave energy to electricity.
Figure 2:
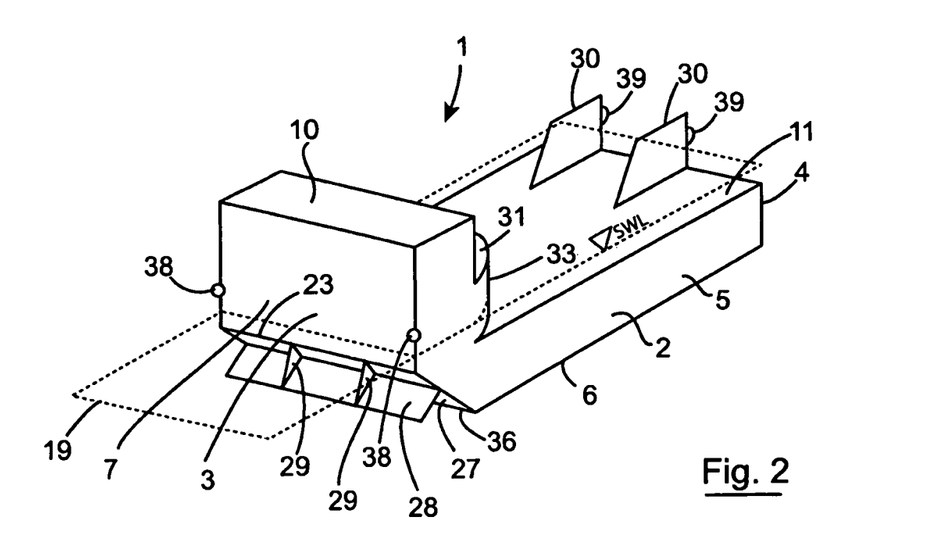
FIG. 2 is another diagrammatic perspective view of the wave energy converter of FIG. 1.
Figure 3:
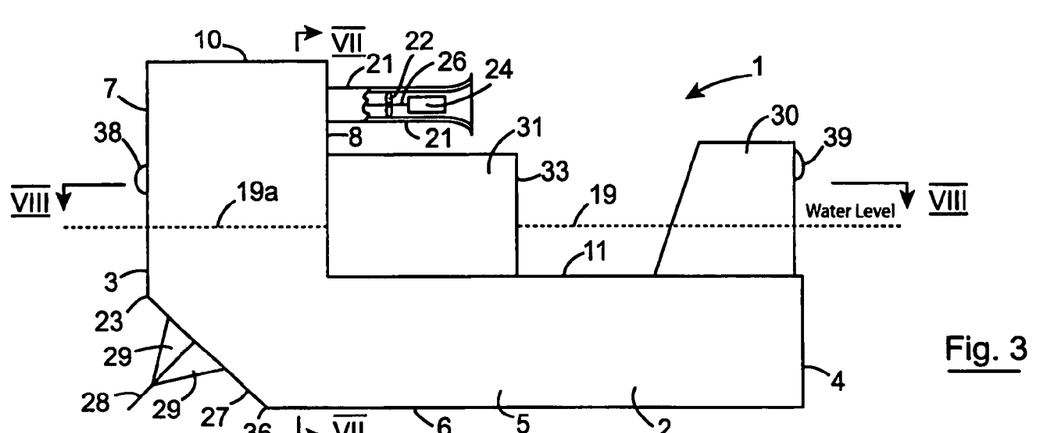
FIG. 3 is a diagrammatic side elevational view of the wave energy converter of FIG. 1.
Figure 4:
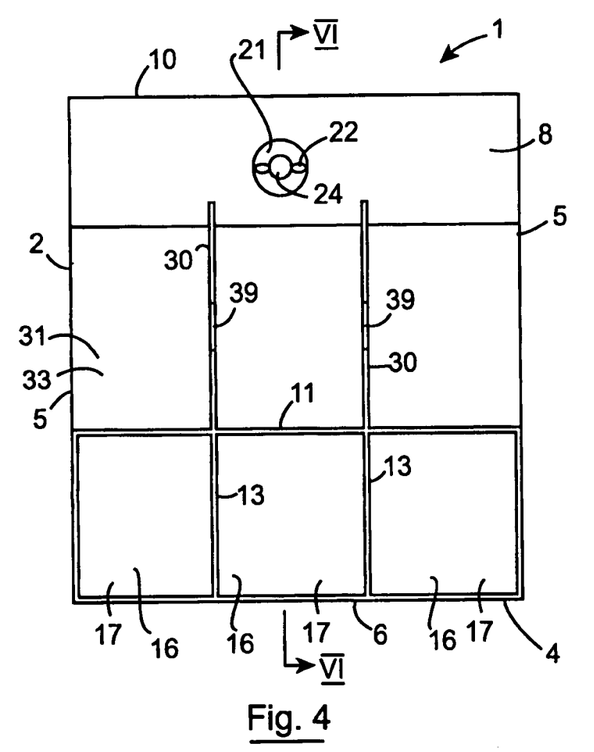
FIG. 4 is a diagrammatic rear end elevational view of the wave energy converter of FIG. 1.
Figure 5:
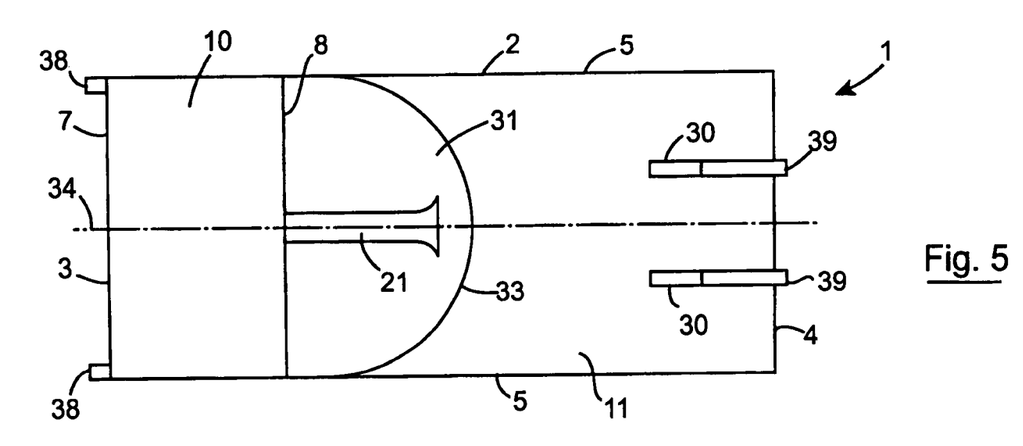
FIG. 5 is a diagrammatic top plan view of the wave energy converter of FIG. 1.
Figure 6:
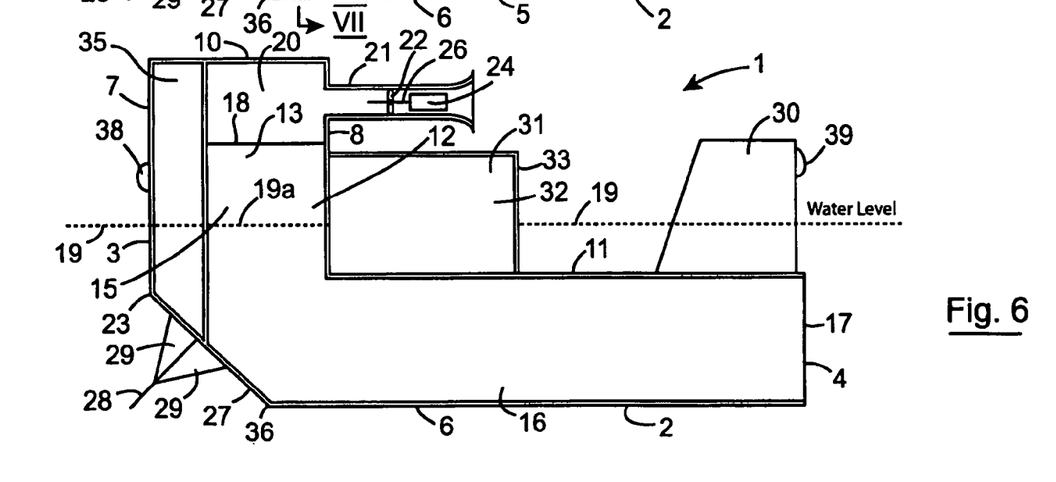
FIG. 6 is a diagrammatic transverse cross-sectional side elevational view of the wave energy converter of FIG. 1 on the line VI-VI of FIG. 4.
Figure 7:
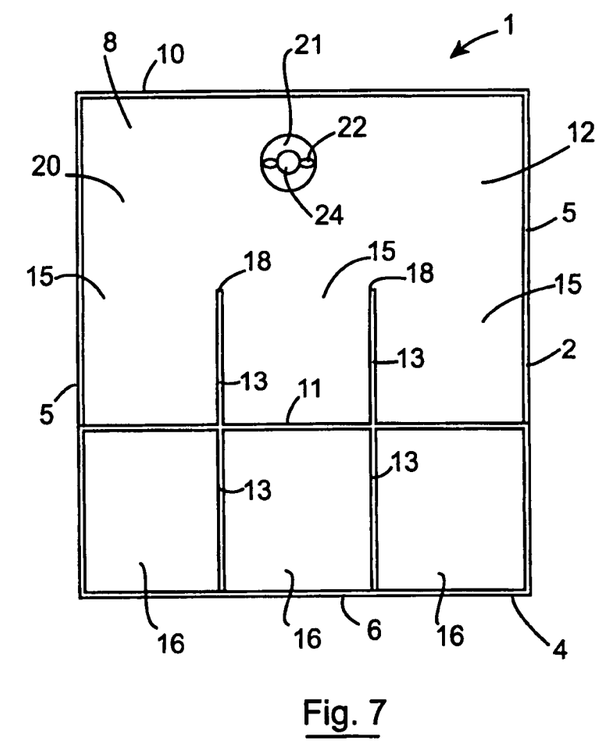
FIG. 7 is a diagrammatic transverse cross-sectional end elevational view of the wave energy converter of FIG. 1 on the line VII-VII of FIG. 3.
Figure 8:
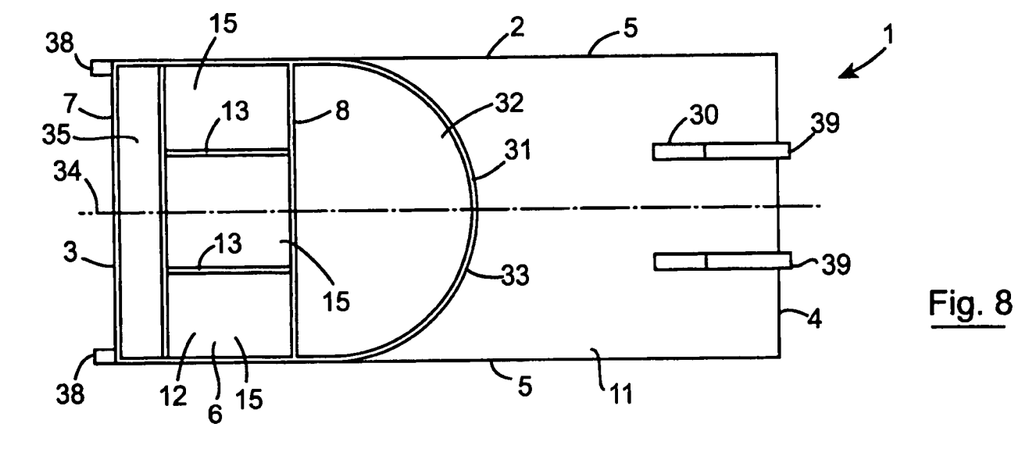
FIG. 8 is a diagrammatic transverse cross-sectional top plan view of the wave energy converter of FIG. 1 on the line VIII-VIII of FIG. 3.
Figure 9:
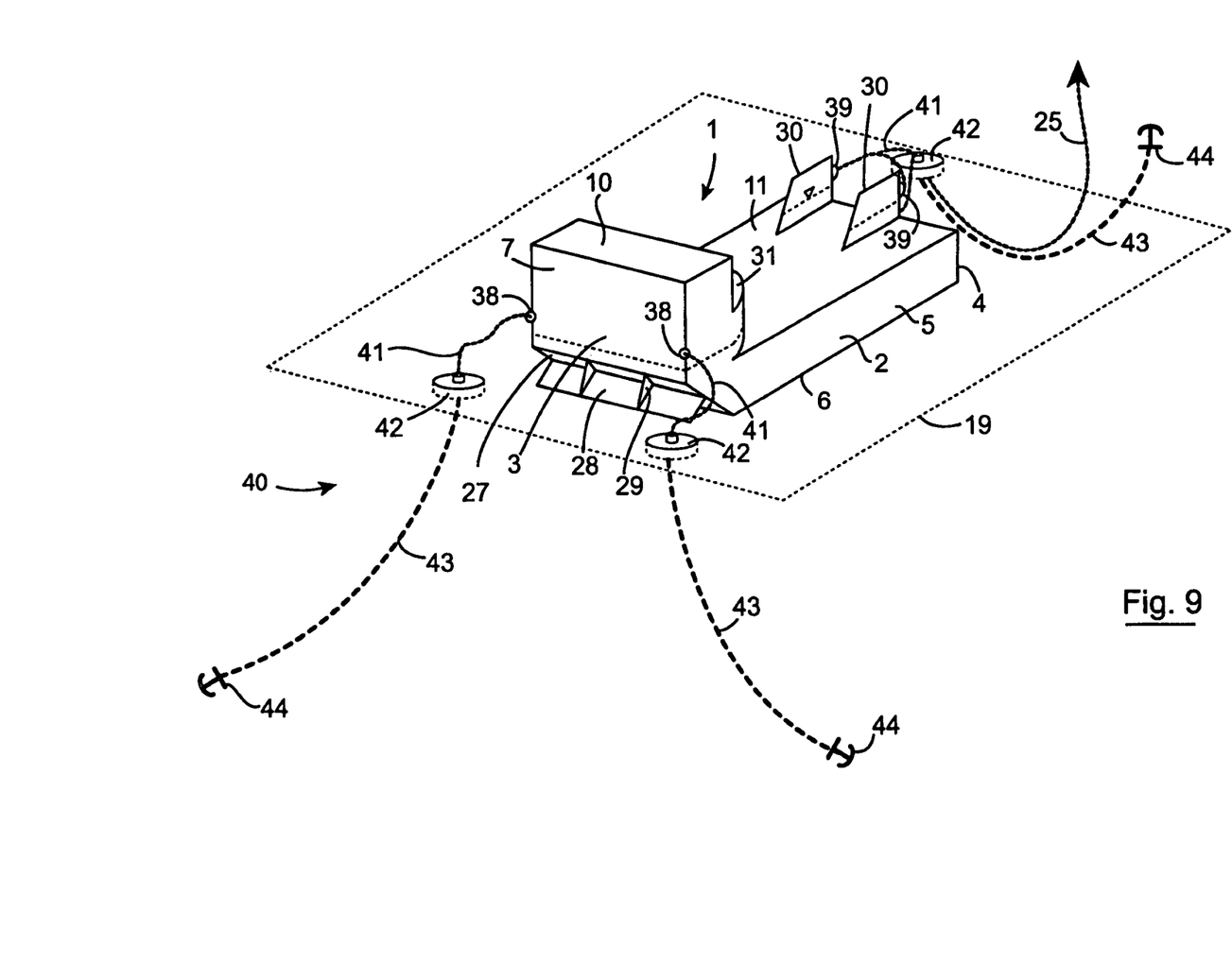
FIG. 9 is a diagrammatic perspective view of the wave energy converter of FIG. 1 illustrated in use.

A converting means comprising a self rectifying turbine 22 is located in the air accommodating duct 21 for converting energy in the air passing through the air accommodating duct 21 to mechanical rotational energy as the air is being urged into and out of the air chambers 15 in response to the varying water level 19a within the air chambers 15. An electrical generator 24 illustrated in block representation only, which is coupled inline to the turbine 22 is driven by the turbine 22 for generating electricity, which in turn is wired through an electrical cable 25 (see FIG. 9) to a land based station (not shown). By virtue of the fact that the turbine 22 is a self rectifying turbine, the turbine 22 drives a rotor shaft 26 of the generator 24 in one direction only, irrespective of the direction of air flow through the air accommodating duct 21.

A forwardly facing lower portion 27 of the front wall 7 of the housing 2 slopes in a generally downward aft direction for minimising turbulence adjacent the lower forward end of the housing 2. A first stabilising plate 28 extends in a generally forward downward direction from the lower sloping portion 27 for controlling the heaving and pitching motion of the housing 2 to maximise the efficiency of conversion of the movement of the housing in response to passing waves 2 to useable energy. The lower sloping portion 27 of the front wall 7 of the housing 2 is inclined to the vertical at an angle of approximately 45° when the housing 2 is floating in still water with the water accommodating ducts 16 extending horizontally in a forward/aft direction, and the air chambers 15 extending vertically upwardly from the water accommodating ducts 16. The first stabilising plate 28 extends substantially perpendicularly from the lower sloping portion 27, and thus is inclined at an angle of approximately 45° to the vertical when the housing 2 is floating in still water with the water accommodating ducts 16 substantially horizontal. The lower sloping portion 27 is located below the waterline 19 of the housing 2 when the housing 2 is floating in still water with the water accommodating ducts 16 extending horizontally. The first stabilising plate 28 extends substantially the transverse width of the housing 2 between the opposite side walls 5, and extends from the lower sloping portion 27 approximately half way between upper and lower edges 23 and 36, respectively, of the lower sloping portion 27, and thus the first stabilising plate 28 extends from the housing 2 at a level below the waterline 19. Four gusset plates 29 extending between the first stabilising plate 28 and the lower sloping portion 27 of the housing 2 reinforce the first stabilising plate 28 to the housing 2.

A pair of spaced apart parallel second stabilising plates 30 extend upwardly from the lower top wall 11 of the housing 2 towards the aft end 4 thereof for stabilising the housing 2 in the waves. The second stabilising plates extend in a general forward/aft direction for maintaining the housing 2 oriented with the forward end 3 thereof facing into oncoming waves.

A buoyancy means for maintaining the housing 2 floating comprises a buoyancy tank 31 which is located on the lower top wall 11 of the housing 2 above the water accommodating ducts 16 adjacent the intermediate wall 8 and aft of the air chambers 15. The buoyancy tank 31 is sealed and defines a secondary hollow interior region 32 for air and extends in a general aft direction from the intermediate wall 8 and terminates in an aft end wall 33, which when viewed in plan view is substantially semicircular. Thus, the distance to which the buoyancy tank 31 extends in an aft direction from the intermediate wall 8 is greater along a longitudinally extending centre line 34 of the housing 2 than the distance to which the buoyancy tank 31 extends in an aft direction along and adjacent the respective side walls 5. As well as maintaining the housing 2 floating, the buoyancy tank 31 also controls the pitching oscillation of the housing 2 by virtue of the position of its centre of buoyancy. Thus, the buoyancy tank 31 effectively controls the relative heaving and pitching motion of the housing 2 in relation to the wave motion, and thus the rising and falling of the water level 19a in the air chambers 15, while the first stabilising plate 28 acts to modify the heaving and pitching motion of the housing 2 but in a controlled manner in order to maximise the efficiency of conversion of the oscillating action of the water level 19a in the air chambers 15 to mechanical rotational energy. In this embodiment of the invention the buoyancy tank 31 is a watertight air tank, although if desired, the secondary hollow interior region 32 may be filled with an expanded lightweight plastics material.

A forward ballast means comprising a forward ballast tank 35 is located at the forward end 3 of the housing 2 forward of the air chambers 15. The ballast tank 35 is adapted for accommodating ballast water pumped in from the ocean, and the ballast in the ballast tank 35 is adjustable by varying the volume of water therein. The ballast in the ballast tank 35 in use is adjusted in order to adjust the buoyancy effect of the buoyancy tank 31, so that the wave energy converter 1 floats in still water with the water accommodating ducts 16 extending substantially horizontally in a forward/aft direction and completely submerged, and the water level 19a in the air chambers 15 is substantially midway between the upper edges. 18 of the partition walls 13 and the level of the lower top wall 11 adjacent the air chambers 15. Additionally, the ballast in the ballast tank 35 is adjusted in order to adjust the buoyancy effect of the buoyancy tank 31, so that the aft water accommodating openings 17 of the water accommodating ducts 16 remain submerged for all orientations of the housing 2 during the pitching oscillation thereof.

Coupling means comprising a pair of spaced apart forward mooring couplings 38 and a pair of spaced apart aft mooring couplings 39 are provided for coupling the housing 2 to a mooring system 40 for facilitating floating and oscillating of the housing 2 in water. The forward mooring couplings 38 are located on the front wall 7 adjacent the respective side walls 5 at a height above the waterline 19 appropriate to local conditions, and the aft mooring couplings 39 are located on the second stabilising plates 30 at a height above the waterline 19 also appropriate to local conditions. Mooring ropes 41 secured to the mooring couplings 38 and 39 and to mooring buoys 42 moor the wave energy converter 1 in the water. Anchor ropes 43 secured to sea bed anchorages 44 anchor the mooring buoys 42. Accordingly, the mooring system 40 is such as to permit the housing 2 to rise and fall with tidal level, while at the same time permitting oscillating of the housing 2 by pitching and heaving in a forward/aft direction in response to passing waves.

Figure 10:
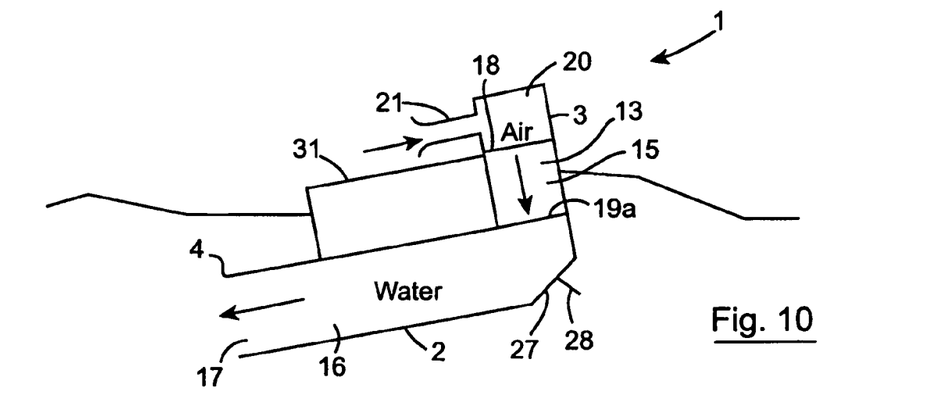
FIG. 10 is a diagrammatic side elevational view of the wave energy converter of FIG. 1 in use.
Figure 11:
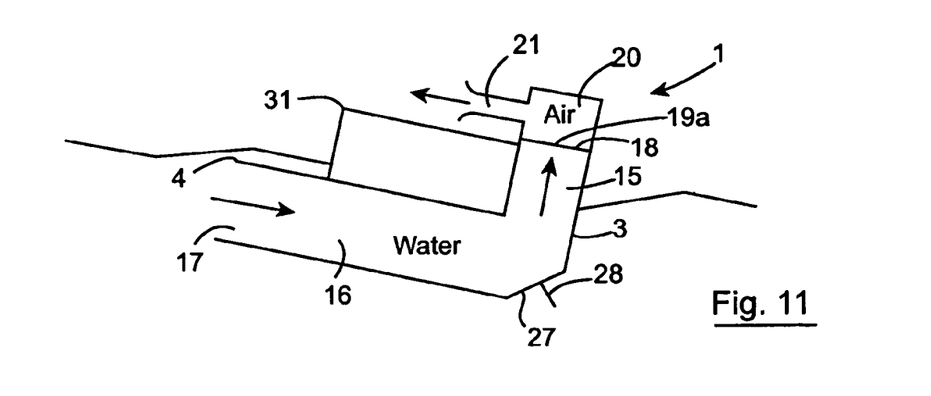
FIG. 11 is a diagrammatic side elevational view similar to FIG. 10 of the wave energy converter of FIG. 1 in use.

In use, with the wave energy converter 1 moored by the mooring system 40 and floating in the ocean, and with the forward end 3 of the housing 2 facing into oncoming waves, and the electrical cable 25 electrically connecting the generator 24 to the land based station (not shown), the wave energy converter 1 is ready for use. As the waves pass the housing 2, initially striking the forward end 3 of the housing 2 and passing along the housing 2 to the aft end 4 thereof, the housing 2 oscillates. As a wave initially strikes the forward end 3 of the housing 2, the forward end 3 rises relative to the aft end 4 as illustrated in FIG. 10, thereby causing water in the air chambers 15 to be discharged through the water accommodating ducts 16, resulting in the water level 19a in the air chambers 15 falling, and air to be drawn into the air chambers 15 through the air accommodating duct 21, the air being drawn inwardly through the air accommodating duct 21 rotates the turbine 22 for driving the generator 24. As the wave reaches the aft end 4 of the housing 2, the aft end 4 is raised relative to the forward end 3, see FIG. 11, thereby causing water to flow into the air chambers 5 through the water accommodating ducts 16, resulting in the water level 19a in the air chambers 15 rising, which in turn discharges air through the air accommodating duct 21 for likewise rotating the turbine 22 to drive the generator 24. The next following wave again raises the forward end 3 of the housing 2 relative to the aft end 4, and so the housing 2 oscillates with a pitching and heaving action in a forward/aft direction in response to the wave motion.

It has been found that the provision of the first stabilising plate 28 maximises the motion of the housing 2 and in turn the rising and falling of the water level 19a in the air chambers 15 for efficiently converting wave energy to mechanical rotational energy.

Comparative tests were carried out on a scale model of the wave energy converter 1 according to the invention and on a prior art wave energy converter of identical construction and dimensions to the wave energy converter according to the invention, with the exception that the prior art wave energy converter was produced without a first stabilising plate and without a ballast tank or any other form of ballast. Tests on the two scale models were carried out in a wave generating tank which generated waves of time period in the range of 5.5 seconds to 13 seconds for time intervals of approximately 5 minutes for each wave period. The waves were of constant height for all periods tested. Both scale models were moored in the wave generating tank and the electrical power output from the respective scale models was measured in kilowatts and averaged over the 5-minute dwell time of the respective wave periods.

It is envisaged that a full scale wave energy converter according to the invention will be approximately 25 meters long from the forward end 3 to the aft end 4 and of transverse width from one side wall 5 to the other of approximately 12.5 meters with three air chambers 15 and a corresponding number of water accommodating ducts 16, namely, three water accommodating ducts 16. Although it is envisaged that a full scale model of the wave energy converter according to the invention may be of length up to 42 meters and width up to 21 meters, and such a wave energy converter could be provided with up to six air chambers and six water accommodating ducts. It is envisaged that one to three equi-spaced apart air accommodating ducts 21 will extend from the intermediate wall 8 communicating with the manifold 20 of the full scale models. The scale models of the wave energy converter according to the invention and the prior art wave energy converter were of length of approximately 2.5 meters and width of approximately 1.05 meters, and each were provided with three air chambers 15 and three water accommodating ducts 16. One single air accommodating duct 21 from the manifold 20 was provided from each scale model. The models were scaled based on the Froude Scaling Law for free surface hydrodynamic models, which requires that the time scales are equivalent to the square root of the length scales.

Figure 12:
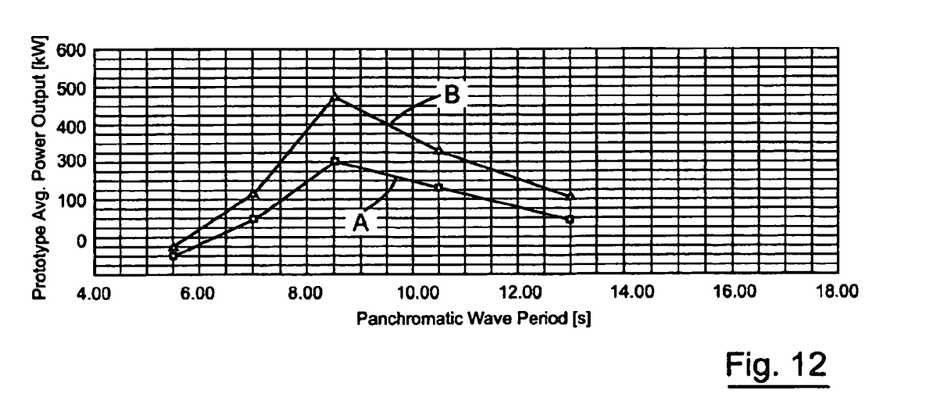
FIG. 12 is a graphical representation of average power output plotted against wave period obtained during comparative tests between the wave energy converter according to the invention and a prior art wave energy converter.

Referring now to FIG. 12, graphs representing the average power output in kilowatts plotted on the Y-axis against the time period in seconds of the waves which is plotted on the X-axis are illustrated. The graph A of FIG. 12 represents the measured average power output produced by the wave energy converter according to the invention during the time intervals during which the wave energy converter was subjected to waves of the respective different time periods. The graph B represents the measured average power output produced by the prior art wave energy converter during the time intervals during which the prior art wave energy converter was subjected to waves of the respective different time periods. As can be seen, for all wave time periods the average power output from the wave energy converter according to the invention exceeded the average power output produced by the prior art wave energy converter. The difference in the average power output produced by the wave energy converter according to the invention over that produced by the prior art wave energy converter peaked at a wave period of 8.5 seconds, which is the resonant period for both scale models, where the average power output produced by the wave energy converter according to the invention was almost 60% higher than that produced by the prior art wave energy converter. At a wave period of 8.5 seconds the wave energy converter according to the invention produced an average power output of approximately 475 kW, while the prior art wave energy converter produced an average power output of approximately 300 kW. Even at the lowest difference, which occurred at the wave period of 13 seconds, the wave energy converter according to the invention produced an average power output of approximately 210 kW which was approximately 40% above the corresponding average power output of 150 kW produced by the prior art wave energy converter.

Thus, for all wave periods between 5.5 seconds and 13 seconds, the wave energy converter according to the invention produced significantly greater average power output than that the prior art wave energy converter. It should be noted that the resonant period is scaled as the square root of the length scale used for modelling.

A quarter scale model of the wave energy converter according to the invention was tested in Galway Bay over an eight month period from December 2006 to August 2007, which confirmed the results achieved by the scale model tests carried out on the wave energy converter according to the invention in the wave generating tank. The scale model tested in Galway Bay was 12.5 meters long by 6.25 meters wide with three chambers 15 and three water accommodating ducts 16. One single air accommodating duct 21 was provided from the manifold 20 in the intermediate wall 8. The average power outputs measured during the Galway Bay test were compared with the average power outputs measured from the scale model of the wave energy converter according to the invention during the tests in the wave generating tank at corresponding combinations of wave height and wave period scaled up according to the Froude Scale Law. The average power outputs of the quarter scale model tested in Galway Bay compared closely with those measured from the scale model of the wave energy converter according to the invention tested in the wave generating tank, thereby confirming the results obtained from the wave energy converter according to the invention tested in the wave generating tank.

While the wave energy converter has been described as comprising three air chambers and three corresponding water accommodating ducts, the converter may be provided with any number of air chambers and any number of water accommodating ducts from one upwards. Additionally, while the converter has been described as comprising one water accommodating duct corresponding to each air chamber, in certain cases, it is envisaged that a plurality of water accommodating ducts may communicate with a single air chamber, and it is also envisaged that a single water accommodating duct may be provided to communicate with a plurality of air chambers. Needless to say, an air accommodating duct may also be provided for each air chamber or for groups of air chambers, and in which case, a turbine and an electrical generator would be provided in each air accommodating duct. Additionally, it is envisaged any number of air accommodating ducts may be provided from the manifold, and in certain cases it is envisaged that a number of air accommodating ducts may converge into a single duct which would house the turbine or other suitable converting means.

While the energy converting means for converting the energy in the air passing through the air accommodating duct to mechanical rotational energy has been described as comprising a particular type of turbine, any other suitable turbine or other converting means may be provided. For example, it is envisaged that a wells turbine or an impulse turbine may be used, and while it is desirable that the turbine be a self-rectifying turbine, this is not essential. For example, in cases where the turbine is not a self-rectifying turbine, a suitable system of ducting and valves would be provided for directing the air in one direction only through the turbine.

Needless to say, while the forward end of the housing has been described as comprising a lower forwardly facing sloping portion, and while the first stabilising plate has been described as extending from the lower sloping portion, the first stabilising plate may extend from any part of the forward end of the housing, but preferably, should extend from the forward end of the housing below the waterline. Needless to say, it is envisaged in certain cases that the lower sloping portion of the forward end of the housing may be omitted. Indeed, while the front wall of the housing has been described as having a lower sloping portion, in certain cases the lower sloping portion may be omitted, and in other cases, the lower portion may be provided by a lower radiused portion, which would also minimise turbulence adjacent the lower forward end of the housing.

While a single air accommodating duct has been described as extending from the manifold, it is envisaged that a plurality of air accommodating ducts may be provided extending from the manifold, and needless to say, it will be appreciated that a turbine and generator would be provided in each air accommodating duct.

It is also envisaged that while the ballast means has been described as comprising a ballast tank for receiving water ballast, it is envisaged that any other suitable ballast means may be provided, for example, in certain cases, it is envisaged that provision could be made for receiving one or more ballast weights, and while it is desirable to provide for adjustment of the ballast, this is not essential, in certain cases, it is envisaged that a non-adjustable ballast means may be provided.

It will also be appreciated that while the buoyancy means has been described as being of particular shape and construction, any other suitable shape and construction of buoyancy means may be provided.

The invention claimed is:

1. A floatable wave energy converter for converting wave energy to electricity, the wave energy converter comprising a housing adapted to oscillate in response to wave motion and extending between a forward end and an aft end with the forward end thereof adapted to face into the waves in use, a forwardly facing lower portion of the housing adjacent the forward end thereof sloping in a generally downward aft direction, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, and a first stabilising plate extending below a waterline of the housing in a generally forward downward direction from the forwardly facing sloping lower portion of the housing adjacent the forward end of the housing for controlling the heaving and pitching motion of the housing to maximise the efficiency of conversion of the movement of the housing in water to useable energy.

2. A floatable wave energy converter as claimed in claim 1 in which the first stabilising plate extends from the housing at a level below the waterline, and extends generally transversely of the forward/aft direction of the housing.

3. A floatable wave energy converter as claimed in claim 1 in which the first stabilising plate extends from the forward end of the housing at an angle to the vertical in the range of 30° to 60° when the housing is floating with the water accommodating duct lying substantially horizontally.

4. A floatable wave energy converter as claimed in claim 1 in which the forwardly facing sloping portion of the housing is located below the waterline, and is inclined to the vertical at an angle in the range of 30° to 60° when the housing is floating with the water accommodating duct lying substantially horizontally.

5. A floatable wave energy converter as claimed in claim 1 in which the first stabilising plate extends from the forwardly facing sloping portion of the housing at an angle of approximately 90° thereto.

6. A floatable wave energy converter as claimed in claim 1 in which the water accommodating opening from the water accommodating duct is located in the aft end of the housing, and the air chamber extends upwardly from the water accommodating duct adjacent the forward end thereof.

7. A floatable wave energy converter as claimed in claim 1 in which a buoyancy means is provided for maintaining the housing floating on the water, the buoyancy means being located aft of the air chamber and above the water accommodating duct.

8. A floatable wave energy converter as claimed in claim 1 in which the converting means for converting air being urged through the air accommodating duct to rotational motion comprises a self-rectifying turbine so that irrespective of the direction of air flow past the turbine, the turbine rotates in one direction only.

9. A floatable wave energy converter as claimed in claim 1 in which at least two air accommodating ducts are provided, and a converting means is located in each air accommodating duct.

10. A floatable wave energy converter as claimed in claim 1 in which a coupling means is provided on the housing for coupling the housing to a mooring system with the forward end of the housing facing into the waves.

11. A floatable energy converter for converting wave energy to electricity, the wave energy converter comprising a housing adapted to oscillate in response to wave motion and extending between a forward end and an aft end with the forward end thereof adapted to face into the waves in use, a forwardly facing lower portion of the housing adjacent the forward end thereof sloping in a generally downward aft direction, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, and a forward ballast means provided adjacent the forward end of the housing for stabilising the housing.

12. A floatable wave energy converter as claimed in claim 11 in which the forward ballast means is located forward of the air chamber.

13. A floatable wave energy converter as claimed in claim 11 in which the forward ballast means is partly defined by a portion of the forwardly facing sloping portion of the housing.

14. A floatable wave energy converter as claimed in claim 11 in which the air chamber is formed in the housing adjacent the forward end thereof, and the water accommodating duct extends aft from the air chamber.

15. A floatable wave energy converter as claimed in claim 11 in which the forward ballast means comprises a ballast tank for accommodating water ballast.

16. A floatable wave energy converter as claimed in claim 11 in which the water accommodating opening from the water accommodating duct is located in the aft end of the housing, and the air chamber extends upwardly from the water accommodating duct adjacent the forward end thereof.

17. A method for improving the efficiency of a floatable wave energy converter for converting wave energy to mechanical rotational energy, wherein the wave energy converter is of the type comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, the method comprising providing a forwardly facing lower portion of the housing adjacent the forward end thereof sloping in a generally downward aft direction, providing a first stabilising plate extending below a waterline of the housing in a generally forward downward direction from the forwardly facing sloping lower portion of the housing adjacent the forward end of the housing for controlling the heaving and pitching motions of the housing to maximise the efficiency of conversion of the movement of the housing in water to useable energy.

18. A method as claimed in claim 17 in which the first stabilising plate extends from the housing at a level below the waterline.

19. A floatable wave energy converter for converting wave energy to electricity, the wave energy converter comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, a first stabilising plate extending below a waterline of the housing in a generally forward downward direction from the forward end of the housing for controlling the heaving and pitching motion of the housing to maximise the efficiency of conversion of the movement of the housing in water to useable energy, and a forward ballast means located adjacent the forward end of the housing for stabilising the housing, the forward ballast means being located forward of the air chamber.

20. A floatable wave energy converter as claimed in claim 19 in which the forward ballast means is located above the level of the first stabilising plate.

21. A floatable wave energy converter as claimed in claim 19 in which the forward ballast means extends upwardly from a level at which the first stabilising plate extends from the forward end of the housing.

22. A floatable wave energy converter as claimed in claim 19 in which the forward ballast means comprises a ballast tank for accommodating water ballast.

23. A floatable wave energy converter for converting wave energy to electricity, the wave energy converter comprising a housing adapted to oscillate in response to wave motion and extending between a forward end and an aft end with the forward end thereof adapted to face into the waves in use, an air chamber formed in the housing, a water accommodating duct formed in the housing for accommodating water into and out of the air chamber as the housing oscillates in response to wave motion for varying the water level in the air chamber, the water accommodating duct terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, a first stabilising plate extending below a waterline of the housing in a generally forward downward direction from the forward end of the housing for controlling the heaving and pitching motion of the housing to maximise the efficiency of conversion of the movement of the housing in water to useable energy, and at least one second stabilising plate extending from the housing, the at least one second stabilising plate being responsive to wave motion passing the housing for maintaining the housing oriented with the forward end thereof facing into the waves.

24. A floatable wave energy converter as claimed in claim 23 in which the at least one second stabilising plate extends in a generally forward/aft direction of the housing, and is located towards the aft end of the housing.

25. A floatable wave energy converter for converting wave energy to electricity, the wave energy converter comprising a housing adapted to oscillate in response to wave motion and extending between a forward end and an aft end with the forward end thereof adapted to face into the waves in use, an air chamber formed in the housing adjacent the forward end thereof, a water accommodating duct formed in the housing for accommodating water into and out of the air chamber as the housing oscillates in response to wave motion for varying the water level in the air chamber, the water accommodating duct extending aft from the air chamber and terminating in a water accommodating opening aft of the air chamber, an air accommodating duct for accommodating air into and out of the air chamber in response to the varying water level therein, a converting means for converting energy in air being urged through the air accommodating duct in response to the varying water level in the air chamber to mechanical rotational energy, and a first stabilising plate extending below a waterline of the housing in a generally forward downward direction from the forward end of the housing for controlling the heaving and pitching motion of the housing to maximise the efficiency of conversion of the movement of the housing in water to useable energy.

* * * * *